(12) United States Patent
Veitch et al.

(10) Patent No.: US 11,125,110 B2
(45) Date of Patent: Sep. 21, 2021

(54) METHOD AND SYSTEM TO SUPPLY OIL TO A MULTI-FILM OIL DAMPER

(71) Applicant: PRATT & WHITNEY CANADA CORP., Longueuil (CA)

(72) Inventors: Thomas Veitch, Toronto (CA); David Beamish, Mississauga (CA); Philippe Bonniere, Toronto (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 281 days.

(21) Appl. No.: 16/355,972

(22) Filed: Mar. 18, 2019

(65) Prior Publication Data
US 2020/0300120 A1  Sep. 24, 2020

(51) Int. Cl.
| F01D 25/16 | (2006.01) |
| F01D 25/04 | (2006.01) |
| F16C 27/04 | (2006.01) |
| F16F 15/023 | (2006.01) |

(52) U.S. Cl.
CPC .......... *F01D 25/164* (2013.01); *F01D 25/04* (2013.01); *F16C 27/045* (2013.01); *F16F 15/0237* (2013.01); *F05D 2220/32* (2013.01); *F05D 2240/54* (2013.01); *F05D 2260/96* (2013.01); *F16C 2360/23* (2013.01); *F16F 2222/12* (2013.01); *F16F 2230/22* (2013.01); *F16F 2230/30* (2013.01)

(58) Field of Classification Search
CPC .... F01D 25/04; F01D 25/164; F16C 2360/23; F16C 27/045; F16C 19/527; F16C 35/077; F16F 15/0237; F16F 2222/12; F16F 2230/30; F05D 2220/32; F05D 2240/54; F05D 2260/96; F05D 2240/50; H02K 5/173
See application file for complete search history.

(56) References Cited

U.S. PATENT DOCUMENTS

| 3,499,691 A | 3/1970 | Baier |
| 4,214,796 A | 7/1980 | Monzel et al. |
| 4,289,360 A | 9/1981 | Zirin |
| 4,775,248 A | 10/1988 | Barbic et al. |
| 4,872,767 A | 10/1989 | Knapp |
| 4,992,024 A | 2/1991 | Heydrich |
| 5,046,718 A | 9/1991 | Hay, II |

(Continued)

FOREIGN PATENT DOCUMENTS

| GB | 1418907 A | 12/1975 |
| GB | 2033495 A | 5/1980 |

OTHER PUBLICATIONS

Search Report issued in Europen Counterpart application No. 20163944.0 dated Sep. 16, 2020.

*Primary Examiner* — Kenneth Bomberg
*Assistant Examiner* — Christopher R Legendre
(74) *Attorney, Agent, or Firm* — Norton Rose Fulbright Canada LLP (57) ABSTRACT

A multi-film oil damper has an annular damper cavity defined within a housing between a radially outward wall, a first radially extending side wall and a second radially extending side wall. Nested damper rings are disposed within the annular damper cavity for defining squeeze film annuli therebetween. The squeeze film annuli are fluidly connected in parallel to an inlet gallery.

14 Claims, 6 Drawing Sheets

(56) References Cited

U.S. PATENT DOCUMENTS

| | | | |
|---|---|---|---|
| 8,337,090 B2 * | 12/2012 | Herborth | F16C 27/04 |
| | | | 384/535 |
| 8,342,796 B2 | 1/2013 | Spencer et al. | |
| 8,919,499 B2 | 12/2014 | Delamour et al. | |
| 9,841,056 B2 | 12/2017 | Snow et al. | |
| 9,890,810 B2 | 2/2018 | Kawashita et al. | |
| 10,808,755 B2 * | 10/2020 | Veitch | F01D 25/164 |
| 2007/0086685 A1 | 4/2007 | Klusman et al. | |
| 2009/0263057 A1 | 10/2009 | Kanki et al. | |
| 2016/0138421 A1 | 5/2016 | Duong et al. | |
| 2020/0300120 A1 * | 9/2020 | Veitch | F01D 25/04 |

* cited by examiner

METHOD AND SYSTEM TO SUPPLY OIL TO A MULTI-FILM OIL DAMPER

TECHNICAL FIELD

The disclosure relates to multi-film oil dampers and, more particularly, to a method and system for supplying oil to a multi-film oil damper cavity.

BACKGROUND

Squeeze film oil dampers with a single oil film are well known and used throughout the gas turbine and turbomachinery industry. Oil dampers are typically placed in series with the rotor system bearing supports and provide damping to a rotor system to reduce vibrations that would otherwise be present in the system. In some cases, such as high rotor imbalance, a large amount of radial damping movement is needed beyond the capacity of a single film and a multi-film damper can be used.

For proper function of an oil film damper with multiple films, each of the films must be supplied with sufficient oil. A typical single film damper is generally supplied with oil from a single supply inlet in the outer diameter of the damper cavity. However in a multi-film damper the flow of oil must follow a more torturous path to fill gaps between rings and to coat damper rings to create individual oil films between each damper ring.

With multiple oil films, the interaction of the multiple oil films and the relatively large radial movement of the multiple film oil damper assembly as a whole present oil flow, air entrapment and oil distribution challenges. Improvement is desirable.

SUMMARY

In one aspect, the disclosure describes a multi-film oil damper in a gas turbine engine, comprising: a housing defining an annular damper cavity between a radially outward wall, a first radially extending side wall and a second radially extending side wall; a plurality of nested damper rings disposed within said annular damper cavity, said damper rings defining a plurality of squeeze film annuli therebetween; and an oil inlet in the first radially extending side wall, the oil inlet having an inlet gallery adjacent the first radially extending side wall, and fluidly connected in parallel to the squeeze film annuli.

In a further aspect, the disclosure describes a gas turbine engine comprising a rotary shaft bearing; a bearing housing; and a squeeze film damper for accommodating relative movements between the rotary shaft bearing and the bearing housing, the squeeze film damper comprising: an annular damper cavity defined within the bearing housing between a radially outward wall, a first radially extending side wall and a second radially extending side wall, a plurality of nested damper rings defining squeeze film annuli therebetween, an oil inlet in the first radially extending side wall of the annular damper cavity in communication with a source of pressurized oil, and wherein the oil inlet includes an inlet gallery fluidly connected in parallel with the squeeze film annuli.

In a still further general aspect, there is provided a method of accommodating radial movement of a rotary shaft bearing relative to a bearing housing, using a multi-film oil damper having an annular damper cavity defined within the bearing housing between a radially outward wall and radially extending first and second side walls, and a plurality of an inner damper rings disposed within the annular damper cavity and defining squeeze film annuli therebetween; the method comprising: distributing oil in parallel to the squeeze film annuli via an inlet gallery radially spanning the squeeze film annuli.

Further details of these and other aspects of the subject matter of this application will be apparent from the detailed description included below and the drawings.

DETAILED DESCRIPTION

Figure 1:
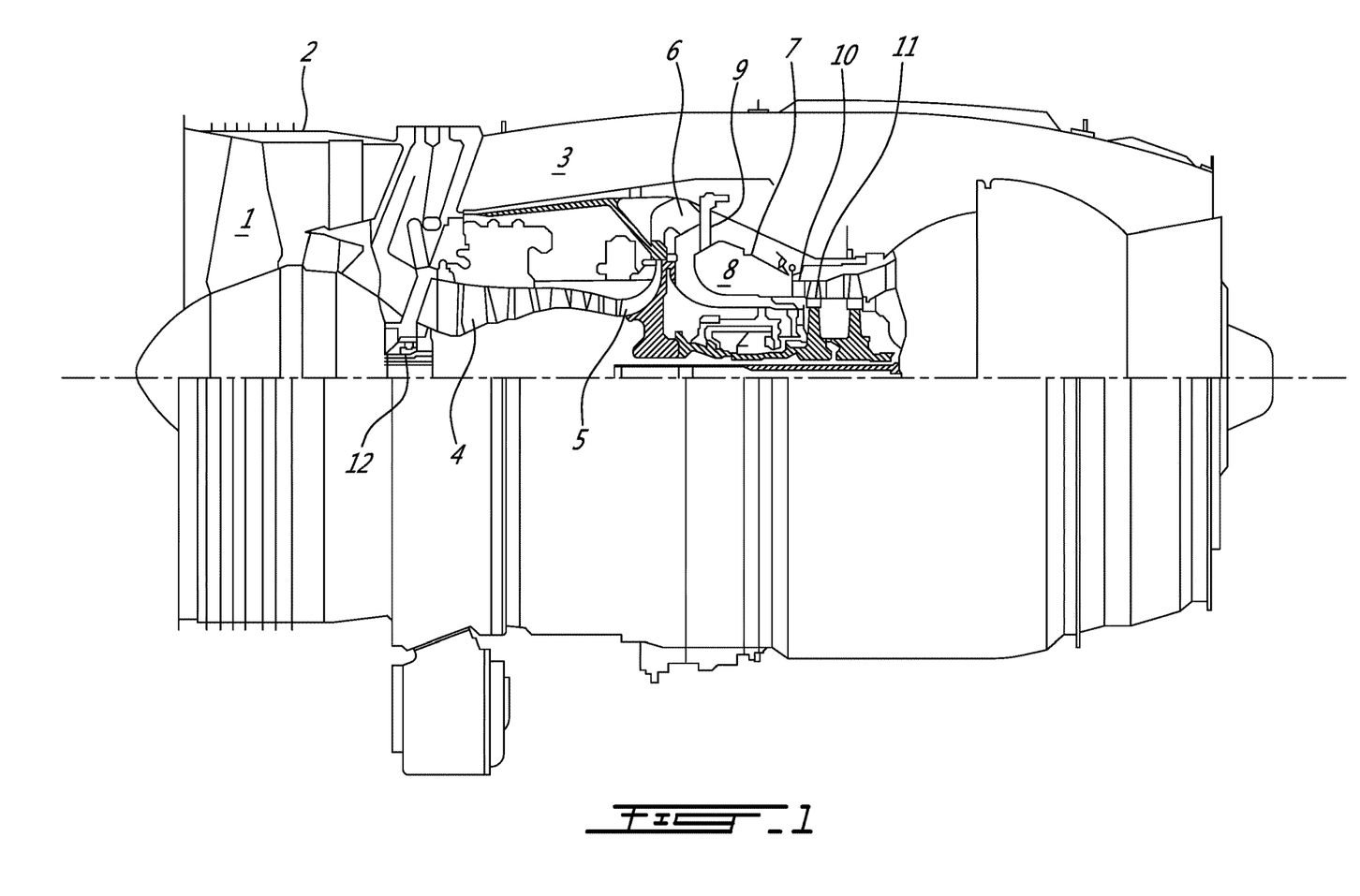
FIG. 1 shows an axial cross-section view of an example turbo-fan gas turbine engine.

FIG. 1 shows an axial cross-section through an example turbo-fan gas turbine engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

Figure 2:
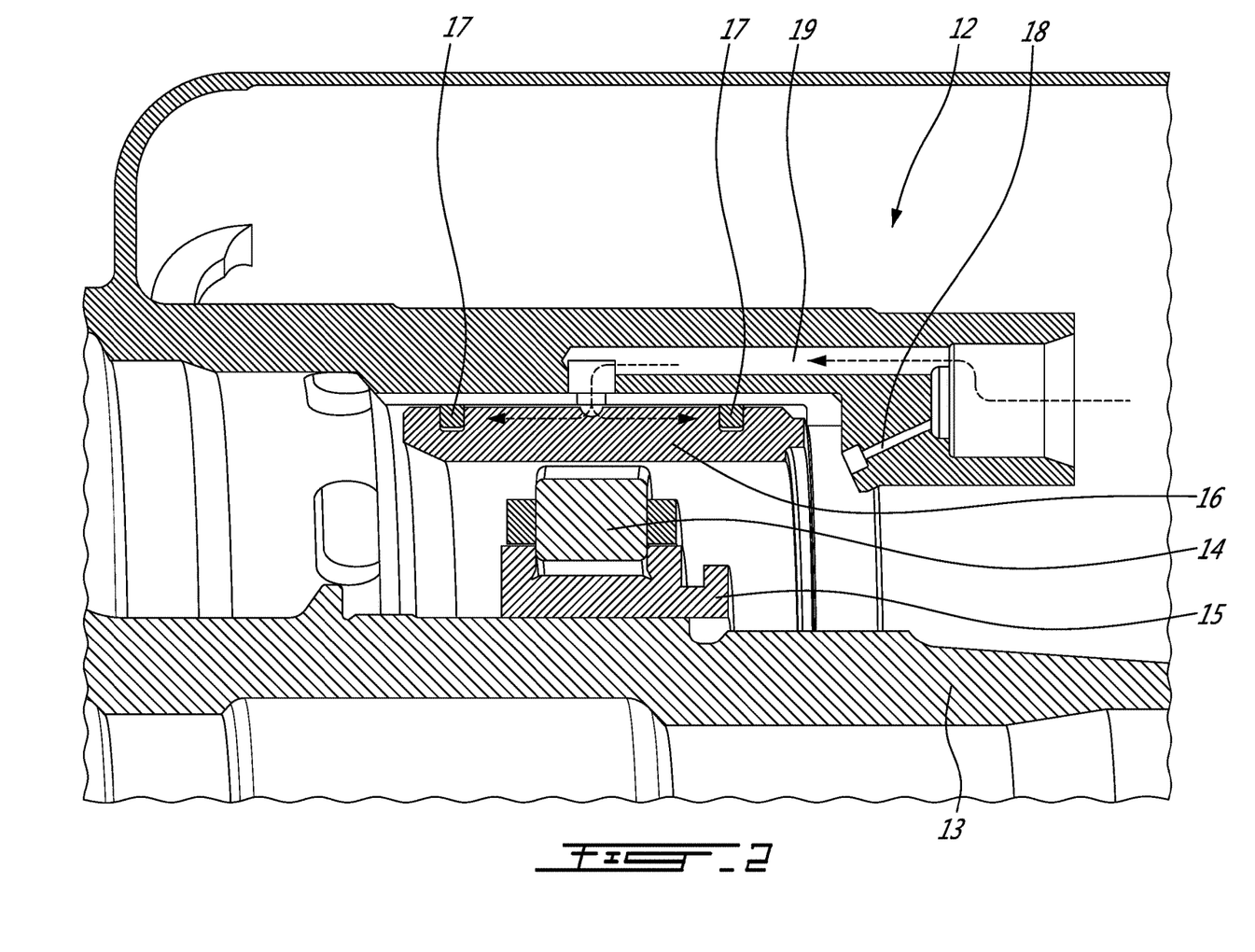
FIG. 2 is an axial detail cross-section view through a bearing housing and bearing showing a single film oil damper with oil contained between two piston rings fore and aft of an oil inlet.

FIG. 1 shows a forward bearing housing 12 that supports the low pressure spool shaft with roller bearings. FIG. 2 shows a detail axial section through the bearing housing 12 that supports the shaft 13 on roller bearings 14 bounded by an inner race 15 and an outer race 16. Between the bearing housing 12 and the outer race 16 is an oil film damper chamber bounded axially by two piston rings 17. Pressurized oil is sprayed toward the roller bearings 14 from a lubrication port 18 and oil is also injected into the oil film chamber through an oil inlet 19. The oil within the oil film chamber serves to reduce the effective bearing support stiffness, thereby allowing sufficient radial motion between the bearing housing 12 and outer race 16 to produce damping. The oil within the oil film chamber is maintained at a pressure to provide an oil film layer and to impede the inflow of air past the piston rings 17. When the piston rings 17 act as an oil seal, as indicated by dashed arrows, the pressurized oil flows one way from the oil inlet 19, purges the oil filled annular oil film chamber and flows out under pressure through radial gaps about the piston rings 17 to merge with oil in the vicinity of the roller bearings 14. Air bubbles within the oil film can be purged continuously from the oil film damper accordingly using a central oil inlet 19.

Figure 3:
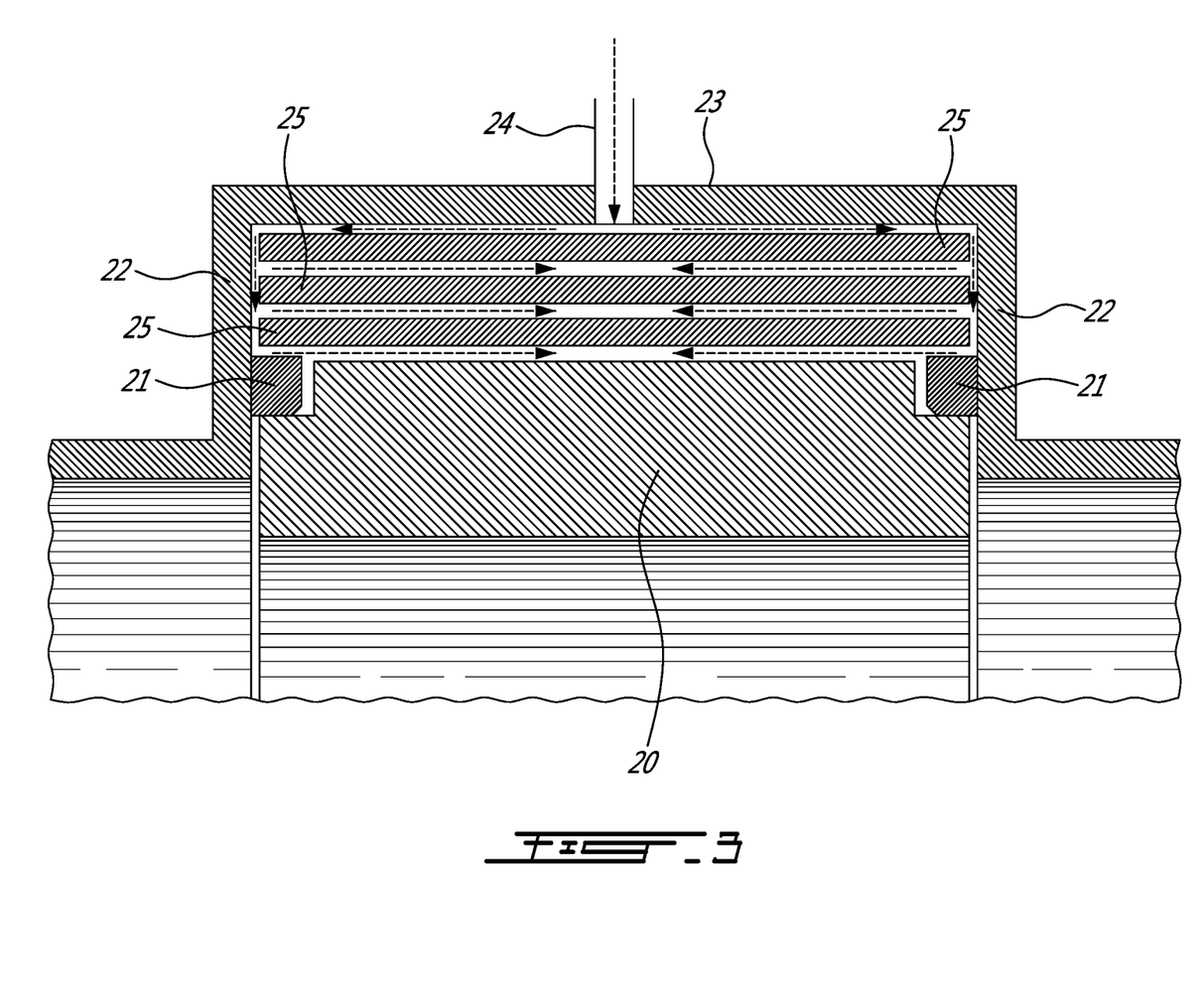
FIG. 3 is an axial cross-section view through a multiple oil film damper having a thicker inner ring with axial end seals and three thinner outer rings showing a potential tortuous route of oil flow from a single central oil inlet.

FIG. 3 shows an axial cross-section view through a multiple oil film damper having a thick inner damper ring 20 with axial end seals 21. The annular oil damper cavity is defined between the inner damper ring 20, radially extending side walls 22 and a radially outward wall 23. The inner damper ring 20 is radially slidable and seals the oil filled damper cavity with end seals 21 that slide on the inside surface of the side walls 22. Pressurized oil is injected into the annular oil film damper through a single oil inlet 24. Three outer damper rings 25 are disposed between the sliding inner damper ring 20 and the outer wall 23. Oil from the oil inlet 24 coats all surfaces of the outer damper rings 25 and the oil film coatings provide for radial movement of the inner damper ring 20 and bearings (not shown) to accommodate imbalance conditions of a rotating shaft (not shown) and provide system damping. FIG. 3 shows dashed arrows indicating a potential tortuous route of oil flow input from a single central oil inlet 24, over the three thinner outer damper rings 25 and purging past the sliding end seals 21. Air can be trapped by the counter flow of oil between outer damper rings 25 or an uneven circumferential distribution of oil film thickness result. The performance of the oil film damper can be detrimentally affected by entrained air in the oil or uneven film thickness.

Figure 4:
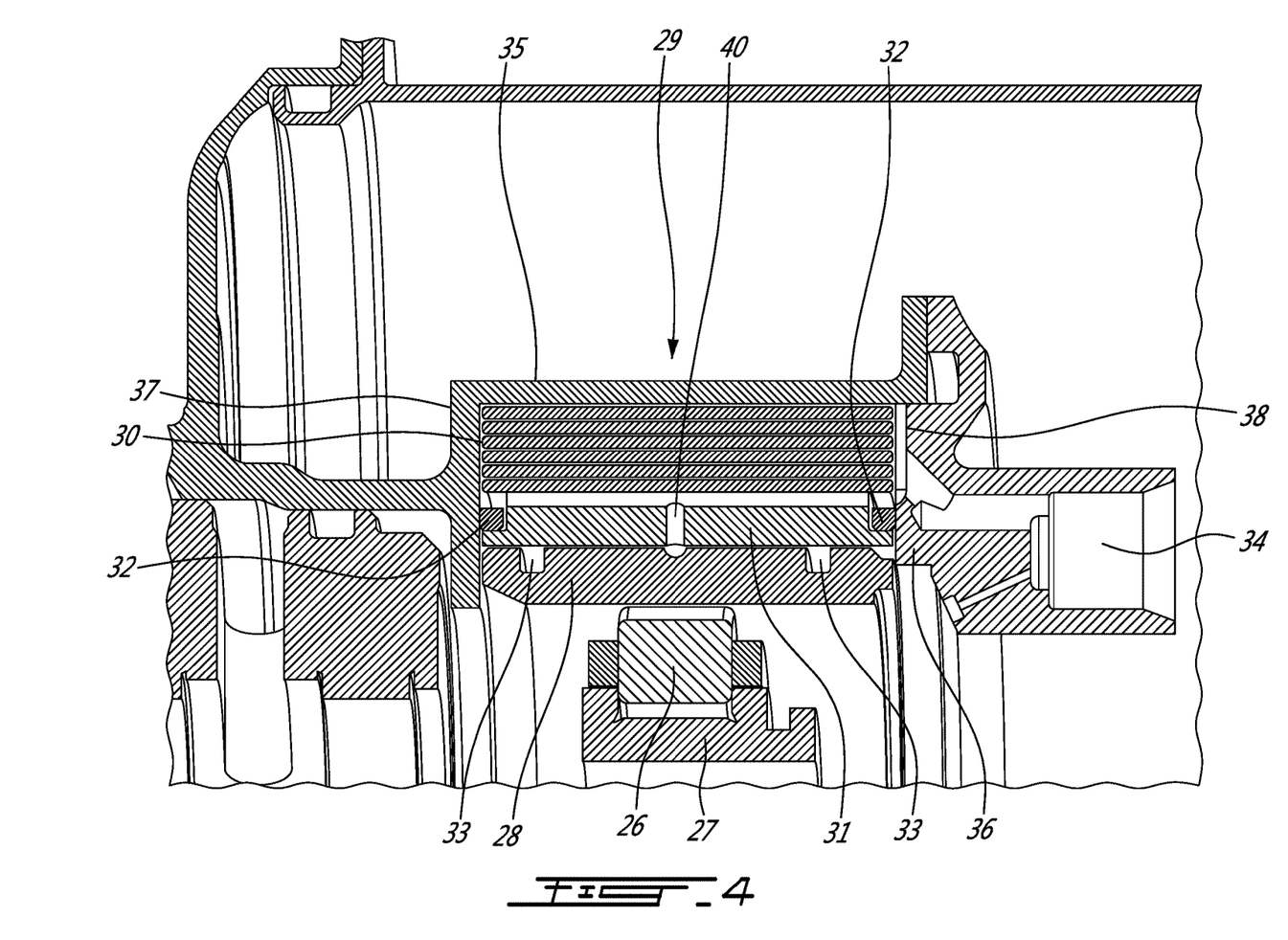
FIG. 4 is an axial cross-section through a multiple oil film damper showing a side wall inlet and inlet oil distribution gallery to provide oil to coat six outer rings in an oil film.

FIG. 4 shows an example multi-film oil damper for accommodating radial movement of a rotary shaft supported by roller bearings 26. The roller bearings 26 are contained within an inner race 27 and an outer race 28 that move radially (up-down as drawn) relative to a bearing housing 29 when the shaft is imbalanced. The oil films coat the outer surfaces of the six outer damper rings 30 and the inner damper ring 31. In the example shown oil is supplied from the oil inlet 34 and is contained by the axial end seals 32 and piston rings 33.

The annular damper cavity is defined within the bearing housing 29 between a radially outward wall 35, a first radially extending side wall 36 and a second radially extending side wall 37. The inner damper ring 31 has axial ends with end seals 32 that abut and slidingly seal against the first and second radially extending side walls 36, 37 of the annular damper cavity. In the example illustrated, six outer damper rings 30 are disposed in a coaxial nested array surrounded by the inner damper ring 31, the first and second radially outward walls 36, 37 and the outer wall 35 of the annular damper cavity. The damper rings are configured to define squeeze film annuli therebetween.

The annular damper cavity has an oil inlet 34 in the first side wall 36 and the oil inlet 34 communicates with a source of pressurized oil such as an engine oil pump (not shown). The pressurized oil provided via the oil inlet 34 serves to immerse the outer surfaces of the six outer damper rings 30 in an oil film.

Figure 5:
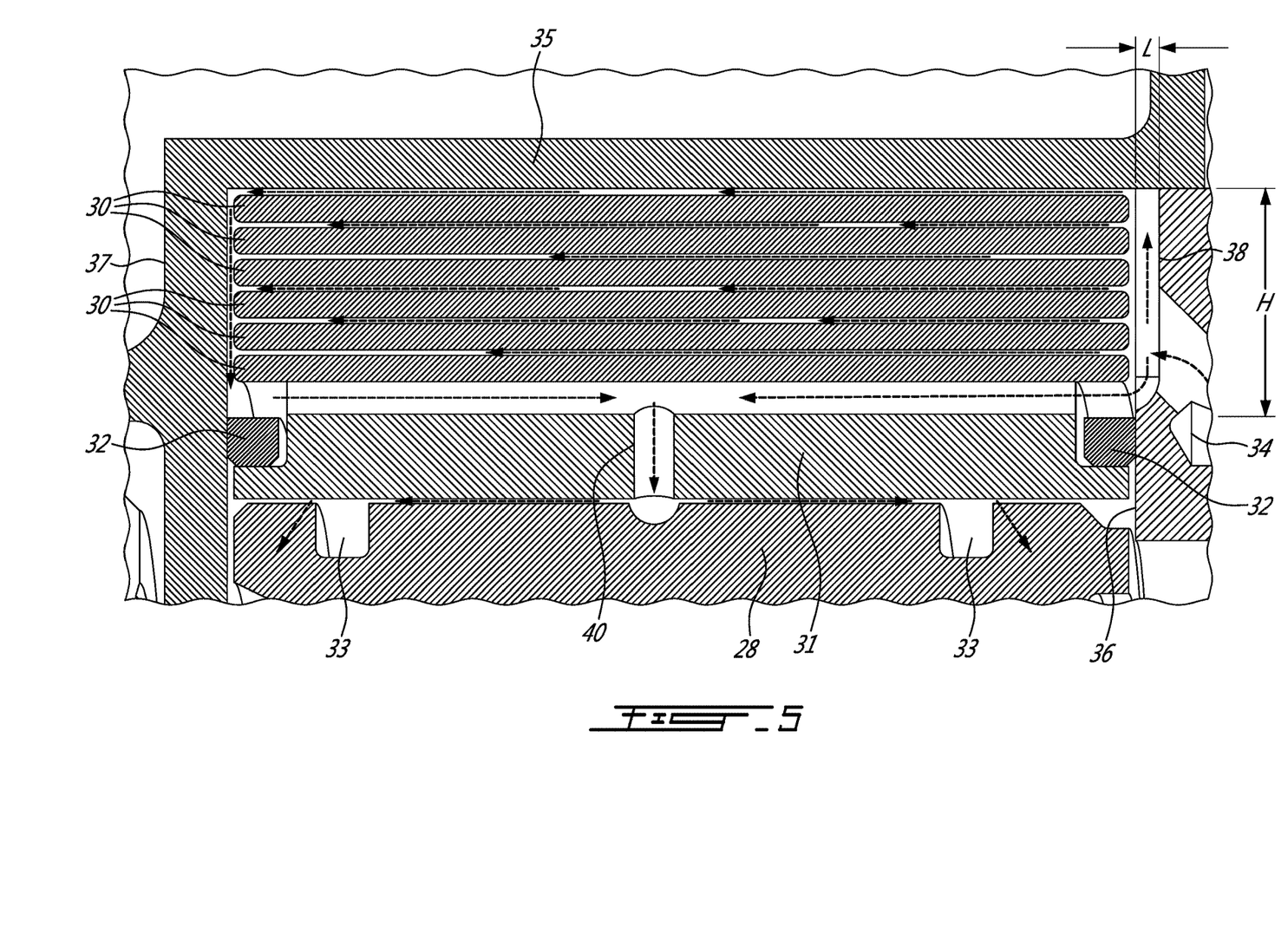
FIG. 5 is a detail view of the multiple oil film damper of FIG. 4 showing with arrows the axial flow of oil from the inlet gallery.

As seen in FIG. 5, the oil inlet 34 includes an inlet gallery 38 recessed axially within the first side wall 36. The inlet gallery 38 provides a radial flow channel through which oil can freely flow and distribute radially from the oil inlet 34 and between the multiple outer damper rings 30 as indicated with dashed arrows. The squeeze film annuli are fluidly connected in parallel to the inlet gallery 38. The inlet gallery 38 has an axial length L and a radial height H as seen in FIG. 5. The radial height H is greater than a radial thickness of the six coaxial nested outer damper rings 30 so that oil can distribute and penetrate between each ring 30 and an oil film can coat all surfaces of the outer rings 30.

Figure 6:
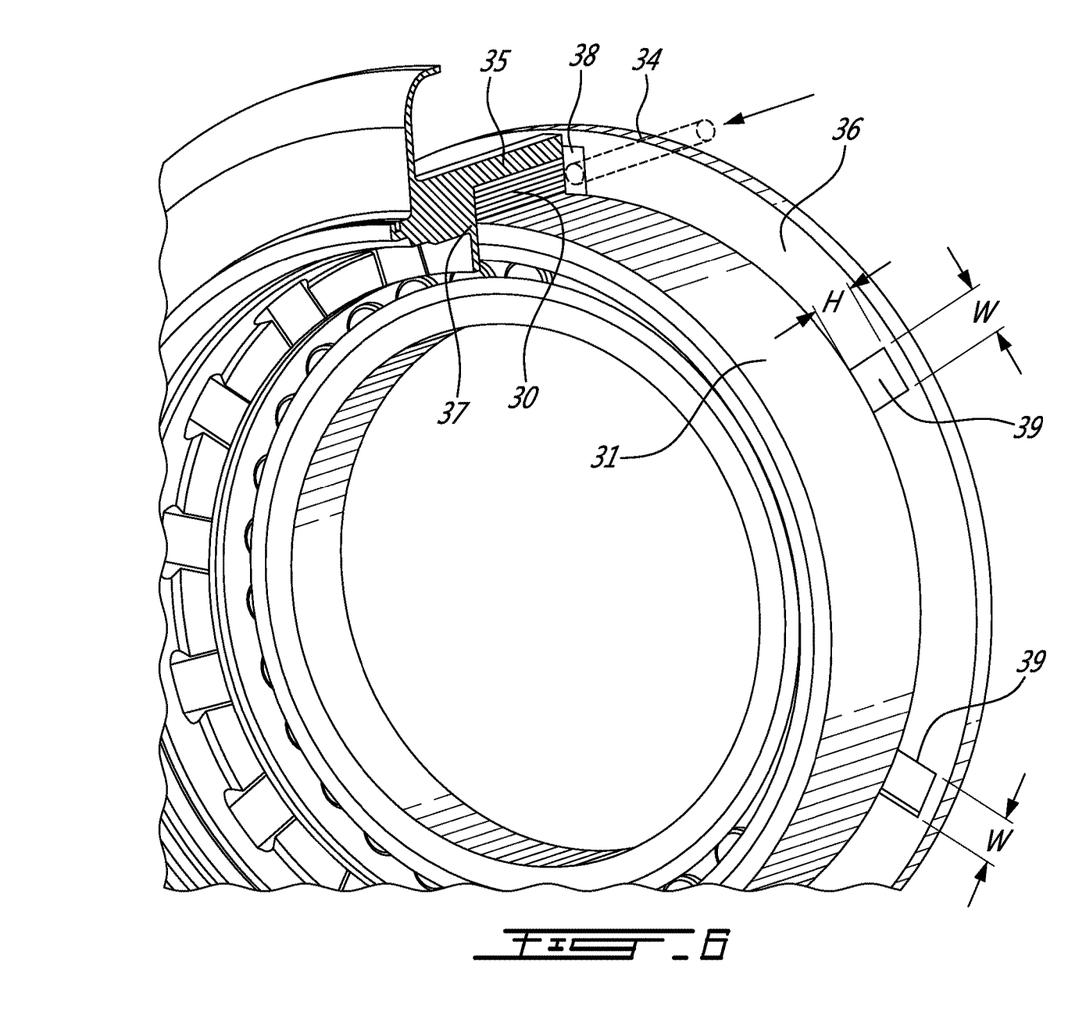
FIG. 6 is a partial axial section of an isometric view showing the cylindrical damper rings, inlet gallery and circumferentially spaced apart auxiliary oil distribution galleries for aiding oil distribution about the circumference of the oil damper.

As seen in FIG. 6, the oil inlet gallery 38 has a limited circumferential dimension and does not extend fully around the entire circumference of the first side wall 36. The oil inlet 34 is illustrated in dashed lines and serves to feed oil into the inlet gallery 38 as indicated by an arrow. The partial cutaway view shows the six outer damper rings 30 contained within the annular oil damper cavity bounded by the side walls 36, 37, the outer wall 35 and the radially sliding inner damper ring 31.

FIG. 6 shows where the annular damper cavity includes multiple oil distribution galleries 39 recessed axially within the first radially extending side wall 36. The oil distribution galleries 39 having an axial length (like L FIG. 5), a circumferential width W and a radial height H. To fully distribute oil within the annular oil damper cavity, the radial height H is greater than a radial thickness of the coaxial nested outer damper rings 30.

As indicated in FIG. 6, the annular damper cavity can include a plurality of oil distribution galleries 39 that are circumferentially spaced apart about a circumference of the annular damper cavity in the first radially extending side wall 36. Alternatively the multi-film oil damper can include a plurality of oil distribution galleries 39 in the second side wall 37 or in both side walls 36, 37. The side walls 36, 37 between the inlet gallery 38 and any oil distribution gallery 39 provide a radial abutment surface for the axial end seals 32 and serve to contain the outer damper rings 30 and oil under pressure. The plurality of oil distribution galleries 39 can be arranged in a circumferential array alternating between the first and second side walls 36, 37 of the annular damper cavity.

As seen in FIG. 5, the oil retention axial end seals 32 slidingly engage the first and second radially extending side walls 36, 37 of the annular damper cavity radially inward of the inlet gallery 38. The oil retention seals 32 also slidingly engage the first and second radially extending side walls 36, 37 radially inward of the oil distribution gallery 39. Therefore the end seals 32 do not engage the inlet gallery 38 nor the oil distribution galleries 39. An integral sealing of the annular oil damper cavity is maintained and the end seals 32 are not exposed to wear accordingly.

FIG. 5 shows an alternative where additional oil films may be provided on both cylindrical surfaces of the inner damper ring 31. The inner damper ring 31 has a radially inward surface abutting the outer race 28 of the roller bearing 26. The inner damper ring 31 has a radial oil passage 40 for providing an oil film coating between the radially inward surface of the inner damper ring 31 and the outer race 28 of the rotary shaft bearing 26. A pair of piston rings 33 between the radially inward surface of the inner damper ring 31 and the outer race 28 serve to contain the oil and coat the surfaces with an oil film.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A multi-film oil damper in a gas turbine engine, comprising:
   a housing defining an annular damper cavity between a radially outward wall, a first radially extending side wall and a second radially extending side wall;
   a plurality of nested damper rings disposed within said annular damper cavity, the plurality of nested damper rings including an innermost damper ring and at least one outer damper ring, said plurality of nested damper rings defining a plurality of squeeze film annuli therebetween;
   an oil inlet in the first radially extending side wall, the oil inlet having an inlet gallery adjacent the first radially extending side wall, and fluidly connected in parallel to the squeeze film annuli; and
   a plurality of oil distribution galleries circumferentially spaced apart about a circumference of the annular damper cavity, the plurality of oil distribution galleries recessed in the first and second radially extending side walls, the plurality of oil distribution galleries having an axial length, a circumferential width and a radial height, the radial height being greater than a radial thickness of the at least one outer damper ring.

2. The multi-film oil damper according to claim 1, wherein the inlet gallery has an axial length, a circumferential width and a radial height, the radial height of the inlet gallery being greater than the radial thickness of the at least one outer damper ring.

3. The multi-film oil damper according to claim 1 wherein the plurality of oil distribution galleries are disposed in a circumferentially staggered array alternating between the first and second radially extending side walls.

4. The multi-film oil damper according to claim 1 wherein axial ends of the innermost damper ring include oil retention seals slidingly engaging the first and second radially extending side walls.

5. The multi-film oil damper according to claim 4 wherein the oil retention seals slidingly engage the first and second radially extending side walls radially inward of the inlet gallery.

6. The multi-film oil damper according to claim 5, wherein the oil retention seals slidingly engage the first and second radially extending side walls radially inward of the plurality of oil distribution galleries.

7. The multi-film oil damper according to claim 1 wherein the innermost damper ring has a radially inward surface configured to abut an outer race of a bearing, the innermost damper ring having a radial oil passage for providing an oil film coating between the radially inward surface of the innermost damper ring and the outer race of the bearing.

8. A gas turbine engine comprising a rotary shaft bearing; a bearing housing; and a squeeze film damper for accommodating relative movements between the rotary shaft bearing and the bearing housing, the squeeze film damper comprising:
   an annular damper cavity defined within the bearing housing between a radially outward wall, a first radially extending side wall and a second radially extending side wall,
   a plurality of nested damper rings defining a plurality of squeeze film annuli therebetween,
   an oil inlet along the first radially extending side wall of the annular damper cavity in communication with a source of pressurized oil, the oil inlet including an inlet gallery fluidly connected in parallel with the squeeze film annuli; and
   a plurality of oil distribution galleries circumferentially spaced apart about a circumference of the annular damper cavity, the plurality of oil distribution galleries radially spanning the squeeze film annuli and recessed in the first and second radially extending side walls.

9. The gas turbine engine according to claim 8, wherein the plurality of nested damper rings comprises an innermost damper ring and at least one outer damper ring, and wherein the inlet gallery has an axial length, a circumferential width and a radial height, the radial height being greater than a radial thickness of the at least one outer damper ring.

10. The gas turbine engine according to claim 9 wherein the oil distribution galleries alternate between the first and second radially extending side walls around the circumference of the annular damper cavity.

11. A method of accommodating radial movement of a rotary shaft bearing relative to a bearing housing, using a multi-film oil damper having an annular damper cavity defined within the bearing housing between a radially outward wall and radially extending first and second side walls, and a plurality of inner damper rings disposed within the annular damper cavity and defining squeeze film annuli therebetween;
   the method comprising:
   distributing oil in parallel to the squeeze film annuli via an inlet gallery radially spanning the squeeze film annuli, and
   promoting oil flow between the squeeze film annuli by further distributing oil radially via a plurality of oil distribution galleries alternating between the first and second side walls circumferentially about the annular damper cavity.

12. The method according to claim 11 wherein the plurality of oil distribution galleries are recessed axially within the first and second side walls.

13. The method according to claim 12 comprising:
   axially conveying oil under pressure from the inlet gallery in the first side wall to the second;
   scavenging the oil adjacent the second side wall; and
   conveying the oil radially inward toward an innermost damper ring of the plurality of inner damper rings.

14. The method according to claim 13 comprising:
   collecting oil on a radially outer surface of the innermost damper ring and conveying oil inwardly via a radial oil passage through the innermost damper ring; and
   providing an oil film coating between a radially inward surface of innermost damper ring and an outer race of the rotary shaft bearing via the radial oil passage.

* * * * *